July 14, 1931.  P. QUINTUS ET AL  1,814,494
THRASHER
Filed Nov. 5, 1927   3 Sheets-Sheet 1
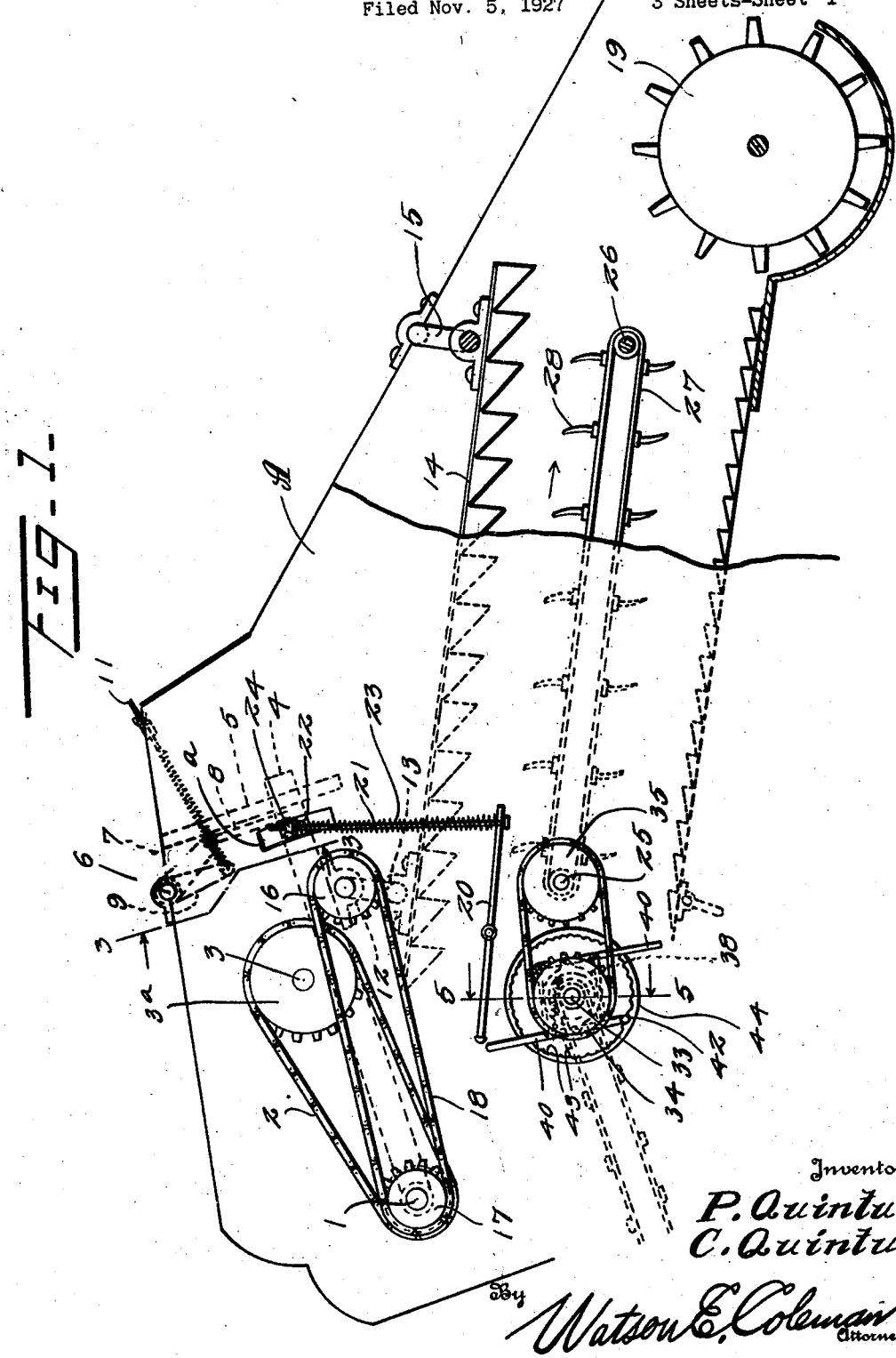
Inventors
P. Quintus
C. Quintus
By Watson E. Coleman
Attorney

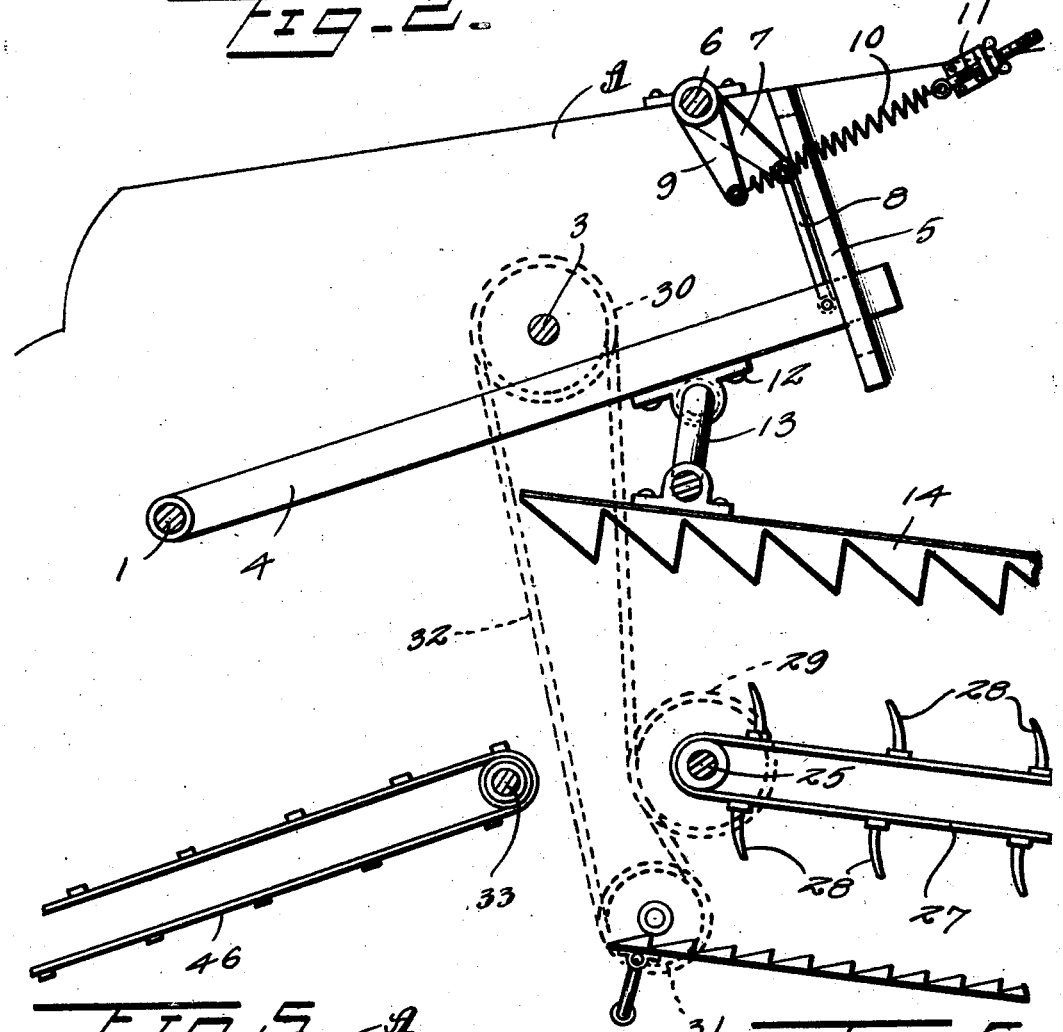
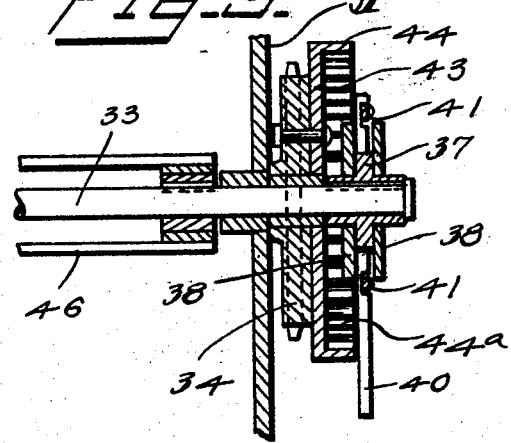
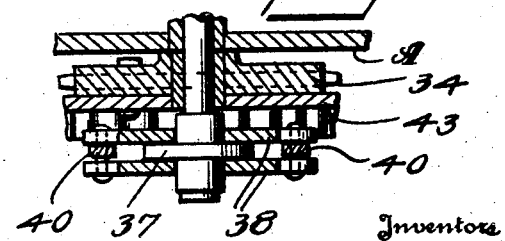

July 14, 1931.  P. QUINTUS ET AL  1,814,494
THRASHER
Filed Nov. 5, 1927   3 Sheets-Sheet 3
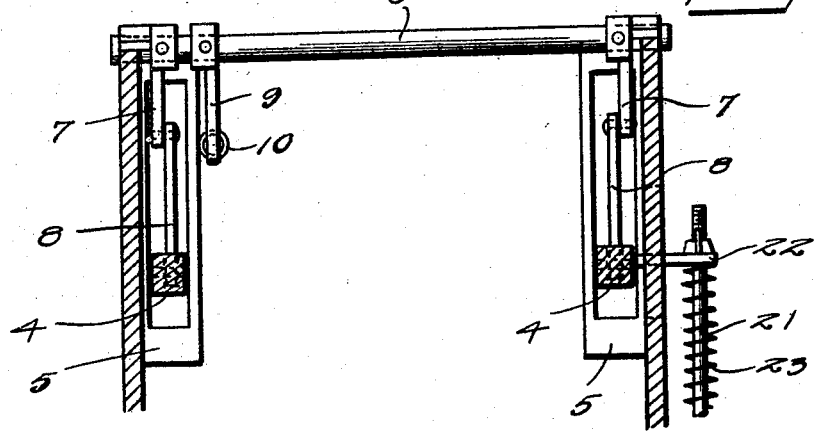
FIG-3-
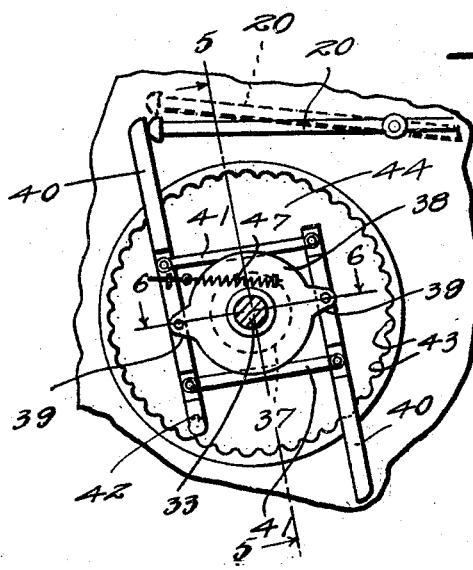
FIG-4-
Inventor
P. Quintus
C. Quintus
By Watson E. Coleman Patented July 14, 1931

1,814,494

UNITED STATES PATENT OFFICE

PAUL QUINTUS AND CHARLES QUINTUS, OF GARNER, IOWA

THRESHER

Application filed November 5, 1927. Serial No. 231,339.

This invention relates to the feeding mechanism of threshing machines, and particularly to certain improvements upon the patent granted to us on September 29, 1925, #1,555,703. In this prior patent we have illustrated a feed conveyor associated with a set of band cutting knives and means for distributing the straw after the bundles have passed the band cutting knives so as to prevent the accumulation of straw in front of the cylinder and concave to an extent which will tend to clog the machine.

An object of the present invention is to provide improved means for positively disconnecting the feed conveyor at any time during the operation of the machine when the amount of straw fed by the conveyor is in excess of the amount drawn away by the cylinder.

A further object is to provide improved means for positively disconnecting the feeding conveyor of the machine from the driving mechanism therefor whenever there is an excess of straw disposed between the upper and lower conveyors, by which the straw is conveyed to the concave and cylinder, and provide improved means for yieldingly supporting the upper conveyor so that it may rise as the straw accumulates beyond a certain amount and fall as the amount of straw decreases.

A still further object is to provide improved means for disconnecting the feeding conveyor from its drive which includes means acting to permit the feeding conveyor to stop if a slat of the feeding conveyor should be broken, for instance, or for any other reason without causing any breakage of the driving mechanism or the other mechanism of the thresher which is driven thereby.

Other objects will appear in the course of the following description.

Our invention is illustrated in the accompanying drawings, wherein:—

Figure 1 is a side elevation of the feeding attachment for a threshing machine, a part of the housing being broken away;

Figure 2 is a fragmentary longitudinal sectional view thereof;

Figure 3 is a transverse section on the line 3—3 of Figure 1;

Figure 4 is an enlarged side elevation of a portion of the attachment;

Figure 5 is a section on the line 5—5 of Figure 4;

Figure 6 is a section on the line 6—6 of Figure 4.

The thresher includes the exterior casing A or housing and the feeding mechanism of the thresher includes a governor-controlled band cutter shaft 1 of conventional construction and mounting and which is driven by a sprocket chain 2 from a counter-shaft 3 having on it the sprocket wheel 3a over which the chain 2 passes. We have not illustrated the band cutters on the shaft 1, as these are ordinary and well known.

Swingingly mounted for vertical movement upon the shaft 1 are forwardly extending arms 4 which have their free ends received in guides 5 mounted upon the sides of the housing A, as shown in Figure 3. A rock shaft 6 is swingingly mounted upon the walls of the housing A at the top thereof and is provided at its ends with arms 7 which are connected by means of links 8 with the free ends of the arms 4. The shaft 6 also carries an arm 9 and a spring 10 is connected at one end to the arm 9 and at its other end is connected to a bolt 11 mounted for longitudinal adjustment on the frame of the thresher. By turning the bolt 11, the spring 10 may be placed under any desired tension. This acts to turn the shaft 6 and resiliently support the free ends of the arms 4 in the guides 5.

Mounted upon the under sides of the bars 4, as shown in Figure 2, are the oppositely disposed bearings 12, and journaled in these bearings is a crank shaft 13. A rake or conveyor formed of longitudinally extending, downwardly toothed bars, designated 14, is provided as usual, the bars being mounted upon the cranked portions of the crank shaft 13. The opposite ends of these conveyor bars 14 are supported upon the depending portions of a cranked shaft 15 which is mounted on the housing A, this cranked shaft 15 being mounted for swinging movement.

Mounted upon the crank shaft 13 is a sprocket wheel 16 (see Figure 1) and mounted upon the shaft 1 is a coacting sprocket wheel 17, a sprocket chain 18 passing around the sprocket wheels 16 and 17 to thereby transmit rotary movement from the shaft 1 to the crank shaft 13. Thus the conveyor bars 14 will be reciprocated in the usual manner so that they will act to force the straw toward the cylinder and concave shown in Figure 1, the cylinder being designated 19. The conveyor bars 14, it will be seen, are supported at their forward ends by the arms 4 through the crank shaft 13, and these arms 4 are in turn supported at their forward ends upon the band cutter shaft but their rear ends are yieldingly supported by the shaft 6, the link 8 and the spring 10. Therefore, as the conveyor bars 14 are raised by straw crowding beneath these conveyor bars 14, the arms 4 will be raised but this, of course, will not in any way affect the reciprocation of the conveyor bars 14 or interrupt the feed of the straw evenly and regularly toward the cylinder and concave. This lifting movement of the arms 4 acts to stop for the time being the forward movement of a delivering or feeding apron 46, as will be later described, thus stopping movement of the bundles of straw toward the band cutter shaft until the excess straw beneath the conveyor bars 14 has been reduced.

The mechanism to this end comprises a lever 20 which is pivoted between its ends to the side wall of the thresher. A rod 21 is engaged with one end of this lever and at its opposite end passes through an eye 22 carried by one of the arms 4. This eye operates through a slot *a* in the side wall of the housing. A spring 23 is coiled around the rod 21 and bears at one end against the eye 22 and at the other end bears against the end of the lever 20. A nut 24 engages the upper end of rod 21 and by turning this nut the tension of the spring 23 may be regulated.

Journaled in the lower portion of the thresher are the shafts 25 and 26. A belt 27 passes around the shafts 25 and 26 and is provided with the usual fingers 28. The shaft 25 is so rotated that the upper run of the belt moves toward the cylinder and concave 19 and the straw which is desposited upon the belt is carried continuously toward the cylinder. Mounted upon the shaft 25 is a sprocket wheel 29, shown in dotted lines in Figure 2. A sprocket wheel 30 is mounted upon the shaft 3, as shown in Figure 2, and an idle sprocket wheel 31 is mounted upon the side wall of the thresher. A sprocket chain 32 is trained around the sprocket wheels 30 and 31. One side of this chain engages the teeth of the wheel 29 and thus rotary movement is transmitted from the shaft 3 to the shaft 25, the sprocket wheel 31 serving as an idler and tightener for the chain 32.

Extending parallel to the shaft 25 is a shaft 33 having a sprocket wheel 34 on one end thereof. Over this shaft 33 passes the conveyor belt 46 which constitutes means whereby the bundles of straw are fed to the band cutter knives and to the distributing conveyors 14 and 27. The sprocket wheel 34 is loose upon the shaft 33 and also loose upon the shaft 33 and attached to the sprocket wheel 34 is an internally toothed wheel 43. This wheel is provided with a flange 44 having teeth 44*a* upon its inner face. The flanged disk or wheel 43 and the sprocket wheel 34 may be connected to each other by bolts or may be formed in any suitable manner for unitary rotation. Keyed upon the shaft 33 is a disk 37, and disposed on each side of the disk 37 are the friction disks 38 having diametrically disposed ears 39.

Pivotally mounted upon these ears 39 are the outwardly projecting arms 40. There are two of these arms, each pivoted intermediate its length and extending in opposite directions. One of these arms carries a laterally projecting roller 42 (see Figure 4) which is adapted to engage with the internal teeth or corrugations 44*a* of member 44. The arms are connected to each other on each side of the shaft 33 by means of the links 41, and a spring 47 is attached to one of the disks 38 and to one of the arms 40 and acts to draw these arms into such position that the lug 42 will engage with the teeth 43 or corrugations. This is the normal position of the parts, and when the arms are in this position a driving connection is formed between the sprocket wheel 34, the disk or wheel 43, the arms 40, the disks 38, the friction disk 37 and the shaft 33.

For the purpose of interrupting said driving connection whenever there is excess of straw below the conveyor bars 14 and these conveyor bars are lifted, we provide the lever 20, heretofore referred to, as shown in Figure 4. When the upper conveyor formed of the conveyor bars 14 is lowered to its normal position, the forward end of this lever 20 is raised to the dotted line position shown in Figure 4 and the full line position shown in Figure 1 and the lever 20 is entirely out of the path of movement of the arms 40. When, however, too much straw is being fed into the thresher for the cylinder and concave to take care of, this accumulation of straw will cause the lifting of the conveyor 14 and as a consequence lifting of the arms 4, which will lift up on the rear end of the lever 20, depressing its forward end into the position shown in full lines in Figure 4 and into the path of movement of the ends of the arms 40. Therefore, as soon as an arm 40 strikes the end of this lever 20, as shown in Figure 4, the arms will be turned upon their pivots against the action of the spring 47 and the lug 42 will be lifted out of engagement with the corrugations or teeth 44a, thus interrupting the driving connection between the sprocket wheel 34 and the shaft 33. As soon, however, as this excess straw has been reduced so that the conveyor formed by the bars 14 may lower, the stop lever 20 will be shifted out of its stopping position, the arms 40 will return to their normal position, and the driving connection will be once more operative. It will be seen that when the lug 42 has been withdrawn from engagement with the teeth 44a, the sprocket wheel 34 and the disk 43 will continue to revolve but no movement will be transmitted to the shaft 33.

The reason for providing the friction disks 37 and 38 is that it is always possible for something to be carried up upon the apron 46 which will jam and tend to prevent the forward movement of the apron and which would break the driving connections of the machine. Thus, for instance, one of the slats of the apron 46 may become loose and this will act to stop the apron suddenly. By providing the friction disks 37 and 38, however, this stoppage of the apron will not in any way affect the driving mechanism, as the friction disks 38 will continue to revolve but the friction disk 37 will remain stationary with the shaft 33.

It will be seen that we have provided in this mechanism means for yieldingly suspending the arms 4 so that these arms will in effect be counterbalanced very delicately and there will be no tendency of the arms 4, by their weight, to press downward upon the conveyor 14 and thus resist the upward movement due to an excess of straw accumulating beneath this conveyor 14. In our prior Patent #1,555,703, there was no such counterbalancing of the arms 21 and as a consequence there was too great a downward pressure on the upper conveyor at all times and excess straw would accumulate between this upper conveyor and the lower conveyor. The mechanism which we have provided for interrupting the driving connection to the apron has been found particularly effective. There is no direct gearing between the shaft 25 and the wheel 34 as there is in our prior patent, and means have been provided to prevent stoppage of the apron from in any way affecting the driving gearing or breaking it.

We claim:—

In a thresher, a straw conveyor and a drive shaft therefor, a bundle conveyor and a drive shaft therefor, a member loosely mounted upon said bundle conveyor shaft and driven from said straw conveyor shaft, a lever pivotally mounted on said bundle conveyor shaft and releasably engaged with said member, a rake overlying the straw conveyor, arms each pivotally supported at one end above the rear end of the rake, means suspending said end of the rake from the arms, a rock shaft overlying the free ends of the arms, arms carried by the rock shaft, links connecting the free ends of said first arms to the rock shaft arms, another arm carried by the rock shaft, a spring connected to said other rock shaft arm and functioning to yieldingly support the rear end of the rake, a lever pivoted between its ends for movement into and out of the path of said first lever, a rod engaged with said second lever, an eye carried by one of said first arms and having said rod passing therethrough, and a spring mounted upon the rod between said eye and second lever.

In testimony whereof we hereunto affix our signatures.

PAUL QUINTUS.
CHARLES QUINTUS.